United States Patent [19]
Bellinger et al.

[11] 3,740,158
[45] June 19, 1973

[54] FLOW CELL

[75] Inventors: S. Lawrence Bellinger, Lake Luzerne, N.Y.; John C. Parker, Ramsey, N.J.

[73] Assignee: Technicon Instruments Corporation, Tarrytown, N.Y.

[22] Filed: Dec. 17, 1971

[21] Appl. No.: 209,231

[52] U.S. Cl. .............................. 356/246, 350/96 R
[51] Int. Cl. ............................................. G01n 1/20
[58] Field of Search ................. 356/181, 244, 246; 350/96 R; 250/227, 218

[56] References Cited
UNITED STATES PATENTS

| | | | |
|---|---|---|---|
| 3,583,817 | 6/1971 | Rachlis et al. | 356/181 |
| 3,370,502 | 2/1968 | Wilks | 350/96 R X |
| 3,506,359 | 4/1970 | Burke et al. | 350/96 R X |
| 3,619,068 | 11/1971 | Broerman | 250/227 X |
| 3,418,053 | 12/1968 | Pelavin | 356/246 |

*Primary Examiner*—Ronald L. Wibert
*Assistant Examiner*—F. L. Evans
*Attorney*—Saverio P. Tedesco, Stephen E. Rockwell, James J. Ramano, Jr. et al.

[57] ABSTRACT

A flow cell having a nonmetallic elongated open-ended tubular body providing a longitudinal sight passageway in a portion of the light path between a light source and a light detector for colorimetric or densitometric analysis of a liquid sample within the passageway, the body having fluid inlet and outlet ports, one through the sidewall structure of the body adjacent each end of the latter. Light-transmitting fluid seals are provided closing the respective ends of the body, at least one of which seals has an interface with the liquid sample in the sight passageway and is structured of a material having a higher refractive index than the tubular body, so as to provide a light pipe for increasing the transmission of light through the flow cell sight passageway to the light detector.

6 Claims, 2 Drawing Figures

FLOW CELL

BACKGROUND OF THE INVENTION

1. Field of the Invention

This invention relates to a flow cell of the type for continuous-flow analysis, which cell is elongated to provide a longitudinal sight passageway therein for liquid samples, having light-transmitting liquid seals in the ends of the sight passageway.

2. Prior Art

Heretofore, continuous--flow type colorimeter flow cells of tubular glass, with sight passageways, having at their respective ends bent or curved liquid inlet and outlet portions, have been constructed by glass-blowing or lamp-working techniques. Such a flow cell is disclosed in Skeggs et al., U.S. Pat. No. 3,241,432, issued Mar. 22, 1966. A flow cell formed in this manner may exhibit good laminar flow characteristics. However, the bent or curved glass at the respective ends of the cell passageway through which light is directed often fails to exhibit optimum optical qualities. For example, some light from the source may be absorbed in the end walls or refracted therefrom instead of passing substantially axially of or along the cell passageway. In addition, optical problems have resulted in part because of lack of uniformity in the curved end walls of such a flow cell, and lack of uniformity of one cell with reference to another.

Attempts have been made to improve the optical qualities of a flow cell by the construction of flat end windows for the sight passageway, which windows have been constructed and assembled so as to have their inner and outer surfaces parallel and lying in planes normal to the axis of the tubular body forming the sight passageway. Such a flow cell is disclosed in Rosin et al. U.S. Pat. No. 3,345,910 issued Oct. 10, 1967, wherein a light path, between a light source and a light detector and passing lengthwise of the cell, is perpendicular to the interface of the liquid with each window. While this construction lessened the aforementioned refraction problem which resulted from the curved or bent liquid inlet and outlet portions of the cell type first described above, and resulted in better uniformity in the end walls of such a flow cell, it did not solve the problem of effectively limiting loss of light from within the end windows such as by transmission directly into the material of the cell body at the interfaces of the latter with the windows. The end windows of this flow cell are glass as is the body of the flow cell.

In the flow cell of Rachlis et al. U.S. Pat. No. 3,583,817 issued June 8, 1971, the body of the cell may be constructed of black glass to shield the light path within the cell from ambient light and to preclude the transmission within the body material of light from the light source toward the light detector. The windows, which may protrude outwardly from the ends of the cell body, may be structured as prisms to compensate for refraction of light by the inclined interfaces of the windows with the liquid in the cell. The windows are also structured of glass and a significant amount of light within these windows, directed from the last-mentioned source, is transmitted directly into the cell body material at the interfaces of the latter with the windows and is lost for analysis purposes.

SUMMARY OF THE INVENTION

It is an object of the invention to provide an improved flow cell of the windowed type, as opposed to the type having curved or bent fluid inlet and outlet ends in the sight passageway of the cell. Another object is to provide a flow cell for colorimetric or densitometric measurements exhibiting great improvements in light-transmission characteristics by substantially lessening light losses, even in applications where the light source is of relatively low intensity, so that the cell has a high signal-to-noise ratio, and so that a high degree of linearity may be achieved in sample analysis results.

Still another object is to provide such a cell having a wide range of spectral transmission for use in analysis at different wavelengths. A further object is to provide a composite flow cell which will not leak fluid, and one which is very resistant to corrosive attack. There is provided a flow cell having an elongated open-ended tubular body providing a longitudinal sight passageway in a portion of the light path between a light source and a light detector for colorimetric or densitometric analysis of a liquid sample within the passageway, the body having fluid inlet and outlet ports, one through the sidewall structure of the body adjacent each end of the latter. Light-transmitting fluid seals are provided closing the respective ends of the body, at least one of which seals has an interface with the liquid sample in the sight passageway and is structured of a material having a higher refractive index than the tubular body, so as to provide a light pipe for increasing the transmission of light either into or out of the flow cell passageway to the light detector.

DESCRIPTION OF THE PREFERRED EMBODIMENTS

Figure 1:
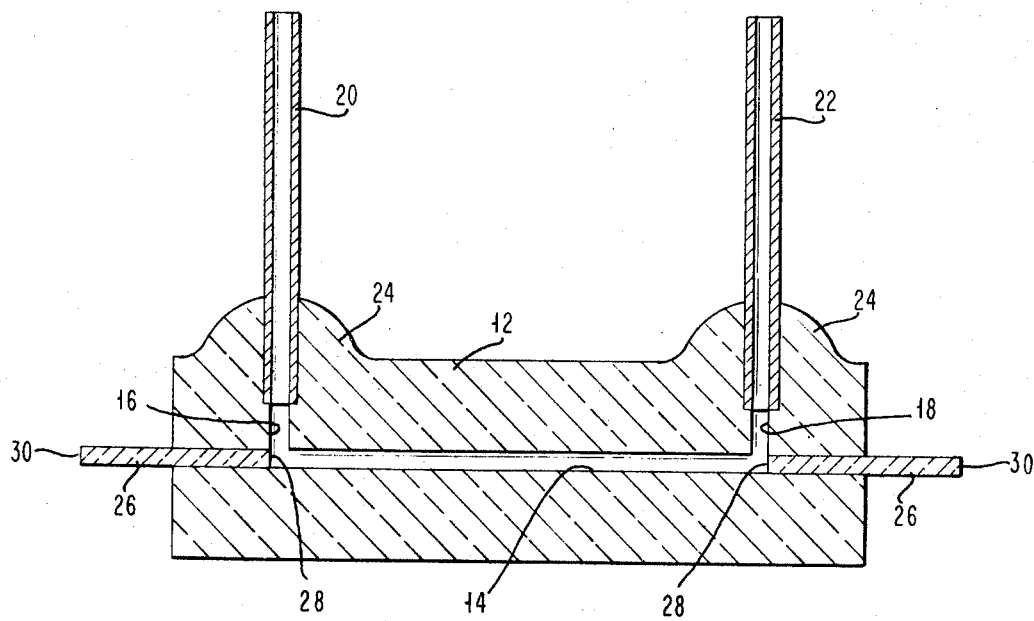
FIG. 1 is a greatly enlarged longitudinal sectional view in elevation, illustrating a flow cell embodying the invention; and, FIG. 2 is an end view of the flow cell.

In the drawing, the flow cell includes, in the usual orientation of the apparatus, a horizontal tubular body member 12 of a nonmetallic material which is strongly resistent to the corrosive action of chemicals, and which is preferably formed of a suitable type of glass which may be transparent. The member 12 is horizontally elongated in the illustrated form and has a smooth axial bore 14 extending therethrough, which bore constitutes a sight passageway. While not limited thereto, the member 12 may be formed of capillary tubing and the bore 14, which is circular, may have a diameter of approximately 0.02 inch. In this form the tubular member 12 may be approximately 0.644 inch in length.

The member 12 has a fluid inlet or port 16 adjacent one end thereof, extending through the side-wall structure of the member and communicating with the bore 14, and has a similar outlet or port 18 adjacent the other end thereof. As illustrated, the ports 16, 18 extend through the top of the passageway 14, but it is not necessary that the ports do this and the port 16, for example may be constructed to open into one side of the passageway 14, if desired. In the illustrated form, the ends of the flow cell are reversible with reference to the direction of fluid flow and/or light transmission. Connected to the port 16 is a tubular part 20 which may be formed of any suitable corrosion-resistant material, but which may alternatively be formed of glass, quartz or sapphire. Connected to the port 18 is a similar tubular part 22. As indicated, the diameter of the ports 16, 18, and the inner diameter of the tubular parts 20, 22, may be similar to the diameter of the bore 14. The tubular parts 20, 22 may be cemented or fused into the body member 12 in the illustrated assembled position, when the body member 12 has been heated to a somewhat softened state. Bosses on the member 12, formed of the same material as the member and indicated at 24, provide additional support for the parts 20, 22.

A pair of light-transmitting end-window seals 26 close the ends of the bore 14 beyond the respective ports 16, 18 to form a liquid-tight fit with the member 12, each window being tangential to the corresponding one of the ports 16, 18. To form such a seal by a heat-shrinking technique, which is preferred, the coefficients of expansion of the material of the member 12 and the material of the windows 26 should closely approximate one another. Also, to avoid distortion of the polished inner faces 28 of the respective windows 26 during the heat-shrinking process, the material of which the windows 26 is structured should have an appreciably higher melting point than the material of the tubular member 12. The material of the windows should be chemically inert. There is a further requirement that the material of the windows 26 transmit light over a wide spectral range, including that of ultraviolet light, so that the flow cell may be utilized for analysis at various different wavelengths according to the substance of the sample to be analyzed colorimetrically or densitometrically in the flow cell.

The material of which at least one of the windows 26 is structured must have a higher index of refraction than the material of the member 12 so that the window has the characteristic of piping light in the light path not shown, into the sight passageway 14 or out of it. Preferably, both of the windows are so formed for optimum light transmission. Such light-piping material will not at its interface with the member 12 transmit light from the light path into the tubular body of the member 12, which transmission would result in a significant amount of loss of light for analysis purposes. As light transmission at the last-mentioned interface is precluded so that it will not enter from the windows directly into the member 12, no such light from within the windows may pass through the material of the body member 12 toward the light detector, not shown, for detection as noise by the latter. Preferably, the tubular body member 12 is shielded along its length and at its ends, but leaving the end windows 26 exposed, by means (not shown) which shield the member 12 against ambient light.

A material which meets all of the above described requirements of the windows 26 is sapphire or lithium niobate, for example. Such windows are of rod-like form, and may have the relatively small diameter previously indicated. For convenience in making connections to external optical elements, not shown, the windows 26 may project, as illustrated, from the respective ends of the tubular body 12. Each window may have a length of approximately 0.250 inch. The outer end surfaces or faces 30, as are the faces 28 prior to assembly of the windows 26 are polished.

The flow cell may be oriented in an optical system such as that shown and described in Rachlis et al. U.S. Pat. No. 3,583,817 issued June 8, 1971 and wherein there is illustrated, among other optical elements at one end of the flow cell in the light path, a light source such as an incandescent lamp, and a photosensitive device such as a photocell at the other end of the flow cell. However, as will be obvious to those versed in the art, the end windows 26 of the flow cell of the invention may be optically connected in a light path between such a light source and such a photosensitive device by one or more bundles of flexible optical fibers such as illustrated in Strack et al. U.S. Pat. No. 3,624,816 issued Nov. 30, 1971. Such a bundle of optical fibers may have one end closely approaching the outer end surface 30 of the particular window 26 and suitably supported for an optical connection between such fiber bundle and the window 26 by optical immersion oil. It will be obvious from the foregoing that if such optical fiber bundles are used, the light path between the light source and the light detector need not be a straight path along its entire length.

Figure 2:
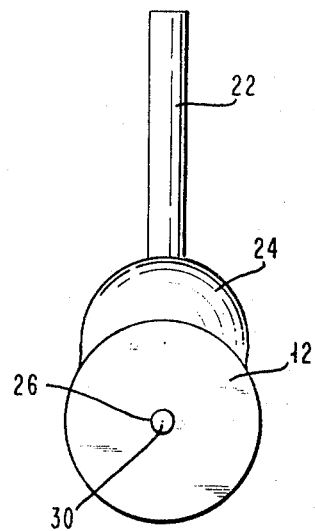

In the operation of the flow cell illustrated in FIGS. 1 and 2, a stream of sample liquid, as in the aforementioned Rachlis et al. patent, may be conveyed to the inlet tube 20 of the flow cell for entry into the port 16 and subsequent passage along the sight passageway 14, which stream may be removed from the flow cell, in the manner of the aforementioned Rachlis et al. patent, through the port 18 and the tubular part 22. As in the last-mentioned patent, the sample stream may be segmented by gas bubbles or other immiscible fluid segments. These immiscible fluid segments may be removed from the stream just prior to introduction of the sample into the flow cell in the manner disclosed in the last-mentioned patent. However, it is preferred that, for the purpose of cleansing the flow cell, these immiscible fluid segments pass through the cell. Whenever any such segment is in the sight passageway 14 the signal output of the light detector is inhibited, so that signals which are generated by the light detector and processed for recording, as on a recorder shown in the last-mentioned patent or on a printout device, are not affected by the presence in the passageway 14 of an immiscible fluid segment such as a gas bubble.

As previously indicated, the refractive index of the material of the end windows 26 is higher than the refractive index of the material of the body member 12, thereby providing light pipes in the ends of the cell, which interface with the sample liquid. Such a construction may result in a 40–50 percent improvement in light transmission through the flow cell. The refractive index of sapphire material employed in the end windows 26 may be approximately 1.76, while the material of the body member 12 may have a refractive index of approximately 1.49 to 1.52.

While the presently preferred embodiments of the flow cell have been shown and described, it will be apparent, especially to those versed in the art, that the flow cell may take other forms and is susceptible of various changes in details without departing from the principles of the invention.

What is claimed is:

1. A flow cell for location intermediate a light source and a photosensitive device for light measurement of a fluid therein in a light path, comprising: a body member defining an open-ended bore therethrough constituting a sight passageway to lie along a portion of the length of said light path, and a pair of fluid seals in the respective open ends of said bore and closing them, each of said seals being constituted by a single solid light-transmitting rod extending into the corresponding end of said bore, portions of said body member in sealing contact with respective ones of said rods having a lower refractive index than said rods and being optically transparent, so that said rods constitute light pipes, said member having a fluid inlet port and a fluid outlet port, said ports opening into said bore adjacent respective ones of said seals for fluid flow through said sight passageway, said member and said seals being formed of chemically resistive material.

2. A flow cell as defined in claim 1, wherein: said material of said body member is glass.

3. A flow cell as defined in claim 1, wherein: said material of said seals is sapphire.

4. A flow cell as defined in claim 1, wherein: said seals project from said body member.

5. A flow cell as defined in claim 1, wherein: said material of said body member is glass, and said material of said seals is sapphire.

6. A flow cell as defined in claim 1, wherein: said body member and said seals have coefficients of expansion closely approximating one another.

* * * * *